United States Patent
Joergl et al.

(10) Patent No.: US 8,863,514 B2
(45) Date of Patent: Oct. 21, 2014

(54) MULTI-STAGE TURBOCHARGER ARRANGEMENT

(75) Inventors: Volker Joergl, Breitenfurt (AT); Timm Kiener, Lake Orion, MI (US); Wolfgang Wenzel, Untertuerkeim (DE); Thomas Kritzinger, Frankenburg a.H. (AT)

(73) Assignee: BorgWarner Inc., Auburn Hills, MI (US)

( * ) Notice: Subject to any disclaimer, the term of this patent is extended or adjusted under 35 U.S.C. 154(b) by 109 days.

(21) Appl. No.: 13/377,666

(22) PCT Filed: Jun. 24, 2010

(86) PCT No.: PCT/US2010/039756
§ 371 (c)(1),
(2), (4) Date: Dec. 12, 2011

(87) PCT Pub. No.: WO2011/008457
PCT Pub. Date: Jan. 20, 2011

(65) Prior Publication Data
US 2012/0093631 A1  Apr. 19, 2012

(30) Foreign Application Priority Data
Jun. 29, 2009  (DE) .................... 10 2009 031 026

(51) Int. Cl.
*F02B 37/013* (2006.01)
*F02B 37/00* (2006.01)
*F01D 9/02* (2006.01)
*F02B 37/12* (2006.01)
*F02C 6/12* (2006.01)
*F02B 37/18* (2006.01)

(52) U.S. Cl.
CPC ............. *F02B 37/18* (2013.01); *F02B 37/004* (2013.01); *F01D 9/026* (2013.01); *F02B 37/127* (2013.01); *F02C 6/12* (2013.01); *F02B 37/013* (2013.01); *F05D 2230/50* (2013.01); *Y02T 10/144* (2013.01); *F05D 2230/53* (2013.01)
USPC .............................. 60/612; 417/406; 417/407

(58) Field of Classification Search
USPC .............................. 417/375, 405–407; 60/612
See application file for complete search history.

(56) References Cited

U.S. PATENT DOCUMENTS

| 4,930,315 | A | * | 6/1990 | Kanesaka | ........................ 60/600 |
| 5,577,900 | A | * | 11/1996 | Ramsden et al. | ............. 417/407 |
| 6,282,899 | B1 | * | 9/2001 | Gladden | ......................... 60/612 |
| 2006/0042247 | A1 | | 3/2006 | Haugen | |

FOREIGN PATENT DOCUMENTS

| JP | 2005344714 A | 12/2005 |
| KR | 20060048176 A | 5/2006 |
| WO | 2007084592 A2 | 7/2007 |

OTHER PUBLICATIONS

International Search Report and Written Opinion ; date of mailing Feb. 15, 2011 , for International Application No. PCT/US2010/039756 ; 10 pages.

* cited by examiner

*Primary Examiner* — Peter J Bertheaud
(74) *Attorney, Agent, or Firm* — BrooksGroup

(57) ABSTRACT

The present invention relates to a multi-stage turbocharger arrangement (1), having a high-pressure turbocharger (20) which has a turbine housing (26A), a bearing housing (27A), a compressor housing (28A); and having a low-pressure turbocharger (21) which has a turbine housing (26B), a bearing housing (27B), a compressor housing (28B); wherein the turbine housings (26A, 26B) are combined to form at least one turbine housing unit (26), and/or wherein the bearing housings (27A, 27B) are combined to form at least one bearing housing unit (27), and/or wherein the compressor housings (28A, 28B) are combined to form at least one compressor housing unit (28).

6 Claims, 1 Drawing Sheet

MULTI-STAGE TURBOCHARGER ARRANGEMENT

Figure 1:
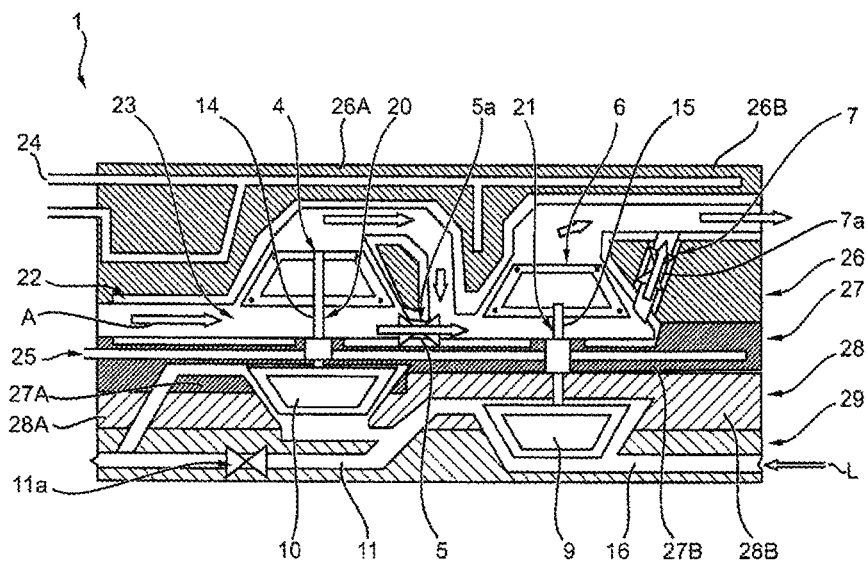

This application claims the benefit of German Application Serial No. 10 2009 031026.6 filed Jun. 29, 2009 and PCT Application Serial No. 2010/039756 filed Jun. 24, 2010.

The invention relates to a multi-stage turbocharger arrangement for an internal combustion engine, as per the preamble of claim 1.

Conventional multi-stage turbocharger arrangements known from the prior art are generally constructed from at least two turbochargers which are arranged in series and whose compressor housing, bearing housing and turbine housing are connected to one another by means of flanges or other connecting elements. Said design entails a large structural volume and an increased weight, and resulting high production costs of multi-stage turbocharger arrangements of said type. Furthermore, the multi-stage turbocharger arrangements of the prior art have inadequate heat dissipation or cooling on account of the high thermally active mass of the structure and the large internal surface area of the exhaust-gas flow ducts. As a result, thermal stresses arising on account of the high temperature differences between the individual assemblies can be prevented only to an inadequate extent, which adversely affects the service life of individual components.

It is therefore an object of the present invention to provide a multi-stage turbocharger arrangement which has a simplified structure having more efficient cooling and which avoids the abovementioned disadvantages of the prior art.

Said object is achieved by means of the features of claim 1.

A simpler structure having a smaller structural volume compared to the turbocharger arrangements of the prior art can be achieved through the combination of the turbine, bearing and compressor housings of the high-pressure turbocharger and low-pressure turbocharger to form a common turbine housing unit, bearing housing unit and compressor housing unit.

The subclaims relate to advantageous refinements of the invention.

The combined housing arrangement permits simpler and cheaper production and machining of the individual housing parts of the multi-stage turbocharger arrangement overall.

As a result of the specific structure of the turbocharger arrangement according to the invention, the heat quantity transferred from the exhaust gas into the outer housing parts is drastically reduced.

Furthermore, an improvement in insulation is obtained by means of an air gap between the exhaust-gas ducts and housing parts.

The use of an expandable inner jacket arrangement for conducting exhaust gas in the flow ducts is also advantageous.

Furthermore, a limitation of the thermal expansion/material stresses can be achieved by means of additional cooling which, in particular by using a separate cooling liquid, ensures a virtually constant temperature in the outer housing parts.

The individual inner and outer housing parts, which are arranged substantially parallel to one another, may also be connected to one another in a simple manner by means of screw connections, welded connections or clamping connections.

Furthermore, the outer housing parts may be produced from housing materials which are easy to cast and/or to machine, such as for example aluminum, steel, magnesium, plastic or combinations of further different materials.

By means of the turbocharger arrangement according to the invention, a significantly smaller hot internal surface of the exhaust-gas flow ducts and a correspondingly lower radiation of heat (in particular in the warm-up phase) is obtained as a result of the increased degree of integration of the arrangement.

It is also possible for two or more shaft/bearing arrangements to be arranged in one of the housings.

Cooling of the housing which contains the two/plurality of shafts/bearings may also take place. A substantially parallel arrangement of the shafts is also possible.

Use may also be made of a bushing (similar to a bearing cartridge), which is inserted into the outer shall, for supporting the bushes and rotating shafts.

Furthermore, the outer housing parts may be produced as pressure-die-cast parts or using other known casting processes.

It is also possible for the compressor spirals to be arranged with an axial offset relative to one another in the shaft direction.

The turbine spirals may also be split perpendicularly to the shafts in order to allow the inner shell to be inserted.

The turbine and compressor spirals may be arranged such that the projections overlap as viewed in the shaft direction in order to obtain a minimum structural volume.

It is also possible for the oil supply and the oil discharge for both bearing systems to be cast or drilled into the housings.

By means of the turbocharger arrangement according to the invention, it is possible for the coolant to flow through some or all of the outer housings. Furthermore, the coolant can flow from one housing to the other.

Furthermore, an integration of the bypass duct of the high-pressure turbine as part of the inner shell and in the outer housing is obtained.

An integration of the wastegate valve of the low-pressure turbine as part of the inner shell is also obtained.

Furthermore, the bypass valve of the low-pressure turbine may be integrated in the outer housing.

The manually actuated compressor bypass valve may also be replaced with an automatic valve.

It is alternatively possible for the wastegate valve of the low-pressure turbine, the wastegate valve of the high-pressure turbine and the bypass valve of the high-pressure compressor to be eliminated.

The bearing arrangement may also be designed such that oil can flow in any direction, with an arrangement in a vertically mirrored position being possible.

Furthermore, the bearing arrangement may be designed such that an arrangement in a rotated position is possible.

The spirals and housings may be designed such that a plurality of different spiral and impeller sizes can be arranged therein.

The turbochargers of the multi-stage turbocharger according to the invention may additionally have a variable turbine geometry.

The multi-stage turbocharger arrangement may be used for sequential turbo charging.

The multi-stage turbocharger arrangement may be used for supercharging using two parallel turbochargers.

Figure 2:
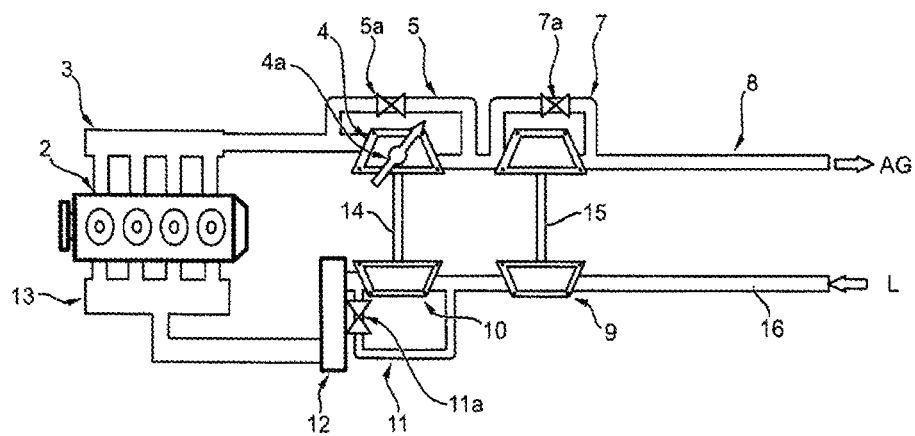

Further details, features and advantages of the invention will emerge from the following description of exemplary embodiments on the basis of the drawing, in which:

FIG. 1 shows a schematically simplified embodiment of a multi-stage turbocharger arrangement according to the invention, and FIG. 2 shows a schematically simplified multi-stage turbocharger arrangement of the prior art.

With reference to FIG. 1, an embodiment of the multi-stage turbocharger arrangement 1 according to the invention will be described below. As can be seen from FIG. 1, the multi-stage turbocharger arrangement 1 has a high-pressure turbocharger 20, which has a high-pressure turbine 4 which is connected by means of a shaft 14 to a high-pressure compressor 10, and a low-pressure turbocharger 21, which has a low-pressure turbine 6 which is connected by means of a shaft 15 to a low-pressure compressor 9. The high-pressure turbine 4 and the low-pressure turbine 6 are arranged in a common turbine housing unit 26, which is divided into a turbine housing section 26A of the high-pressure turbocharger 20 and a turbine housing section 26B of the low-pressure turbocharger 21. An inner shell 23 which can expand as a result of heat is inserted into the interior of the turbine housing unit 26, in the interior of which inner shell 23 hot engine exhaust gas Ag flows through the high-pressure turbine 4 and the low-pressure turbine 6. Formed between the inner shell 23 and the turbine housing unit 26 is an air gap 22 which insulates the inner shell 23, which is heated by the engine exhaust gas Ag, with respect to the turbine housing unit 26. Furthermore, the turbine housing unit 26 has formed in it cooling ducts 24 for a coolant which flows therein which reduces the temperature of the turbine housing unit 26 or keeps said temperature at a level which is admissible in all operating states of the turbocharger arrangement 1.

Also formed in the turbine housing section 26A of the high-pressure turbocharger 20 is a bypass 5 of the high-pressure turbine 4, which bypass 5 has a regulating valve 5a by means of which the engine exhaust gas Ag bypasses the high-pressure turbine 4 when the regulating valve 5a is open. Furthermore, a wastegate arrangement 7 is formed in the turbine housing section 26B of the low-pressure turbocharger 21, in the interior of which wastegate arrangement 7 is arranged a wastegate valve 7a. When the wastegate valve 7a is open, a part of the flow of the engine exhaust gas Ag can bypass the low-pressure turbine 6 and flow directly into an exhaust 8 (see FIG. 2).

The shaft 14 of the high-pressure turbocharger 20 and the shaft 15 of the low-pressure turbocharger 21 are mounted in a common bearing housing unit 27 which is assembled from a bearing housing section 27A of the high-pressure turbocharger 20 and a bearing housing section 27B of the low-pressure turbocharger 21. The bearing housing unit 27 has a cooling duct 25, the coolant which flows therein cooling the bearing housing unit 27 with respect to the adjacent inner shell 23 of the turbine housing unit 26.

The high-pressure compressor 10 of the high-pressure turbocharger 20 and the low-pressure compressor 9 of the low-pressure turbocharger 21 are arranged in a common compressor housing unit 28 which is assembled from a compressor housing section 28A of the high-pressure turbocharger 20 and a compressor housing section 28B of the low-pressure turbocharger 21 and which is closed by means of a compressor cover 29. As can be seen from the illustration of FIG. 1, the high-pressure compressor 10 is partially also formed in the bearing housing unit 27 and the low-pressure compressor 9 is partially also formed in the compressor cover 29.

As can also be seen from FIG. 1, air L is supplied to the low-pressure compressor 9 from the outside via a duct 16 formed in the compressor cover 29, which duct 16, over its further profile, is formed in the compressor housing unit 28 between the low-pressure compressor 9 and the high-pressure compressor 10, and runs through the bearing housing unit 27, the compressor housing unit 28 and the compressor cover 29 downstream of the high-pressure compressor 10. Furthermore, a compressor bypass duct 11 is formed in the compressor cover 29 in the region of the high-pressure compressor 10, which compressor bypass duct 11 comprises a compressor bypass valve 11a. Through said compressor bypass duct 11, the charge air L can be conducted entirely or partially around the high-pressure compressor 10 in order to prevent throttling of the high-pressure compressor 10 at large air flow quantities.

The connecting surfaces, which are formed substantially parallel to one another, of the common turbine housing unit 26, bearing housing unit 27 and compressor housing unit 28 are connected to one another by means of screw connections, welded connections, adhesive connections and/or clamping connections, even if this is not illustrated in FIG. 1.

The high-pressure turbine 4 and the low-pressure turbine 6 or the low-pressure compressor 9 and the high-pressure compressor 10 can each have a variable turbine geometry which, in FIG. 2, is denoted by way of example by the reference symbol 4a in the case of the high-pressure turbine 4. Furthermore, the compressor bypass valve 11a may be an automatic or regulated valve, and the wastegate valve 7a may be omitted in some arrangements in order to save costs.

In the embodiment of the multi-stage turbocharger arrangement according to the invention illustrated in FIG. 1, the hot exhaust gas flows only in the inner shell 23, which is arranged in a sandwich-like manner between the turbine housing unit 26 and the bearing housing unit 27, which have the cooling ducts 24 and 25, in order to prevent overheating of the turbine housing unit 26 and of the bearing housing unit 27. The cooling ducts 24 and 21 may alternatively also be connected to one another. In further conceivable embodiments, the housing units 26, 27 and 28 may also be divided differently than in the embodiments illustrated here. Furthermore, it is alternatively also possible for all the housing units to be cooled or for only parts of the exhaust gas flow ducts to be insulated by an air gap.

FIG. 2 shows a schematically simplified illustration of a multi-stage turbocharger arrangement of the prior art, as is used for example in a conventional two-stage turbocharger system of a diesel engine. Here, identical components are denoted by the same reference symbols as in FIG. 1. The multi-stage turbocharger arrangement 10 illustrated in FIG. 2 indicates the flow profile of the exhaust gas Ag of an engine 2 from an exhaust manifold 3 to the discharge through an exhaust 8, and the flow profile of the inducted air L through an intake line 16 to an intake manifold 13 of the engine 2. Said conventional turbocharger arrangement is known in numerous similar designs and variations, the construction of which will however not be described in any more detail here.

The multi-stage turbocharger arrangement according to the invention has a significantly smaller number of components and a lower overall weight in relation to the known turbocharger arrangements of the prior art. Furthermore, the comparatively significantly smaller structural volume is of great advantage during the installation of the turbocharger systems.

To supplement the disclosure, reference is explicitly made to the diagrammatic illustration of the invention in FIG. 1.

LIST OF REFERENCE SYMBOLS

1 Multi-stage turbocharger arrangement
2 Engine
3 Exhaust manifold
4 High-pressure turbine
4a Variable turbine geometry
5 Bypass of the high-pressure turbine
5a Regulating valve
6 Low-pressure turbine
7 Wastegate arrangement
7a Wastegate valve
8 Exhaust
9 Low-pressure compressor
10 High-pressure compressor 11 Compressor bypass duct
11a Compressor bypass valve
12 Charge-air cooler
13 Intake manifold
14 Shaft of the high-pressure turbocharger
15 Shaft of the low-pressure turbocharger
16 Duct
20 High-pressure turbocharger
21 Low-pressure turbocharger
22 Air gap
23 Inner shell
24 Cooling duct in the turbine housing unit
25 Cooling duct in the bearing housing unit
26 Turbine housing unit
26A Turbine housing section of the high-pressure turbocharger
26B Turbine housing section of the low-pressure turbocharger
27 Bearing housing unit
27A Bearing housing section of the high-pressure turbocharger
27B Bearing housing section of the low-pressure turbocharger
28 Compressor housing unit
28A Compressor housing section of the high-pressure turbocharger
28B Compressor housing section of the low-pressure turbocharger
29 Compressor cover
Ag Engine exhaust gas
L Inducted air

The invention claimed is:

1. A product comprising a multi-stage turbocharger arrangement,
having a high-pressure turbocharger which has
a first turbine housing,
a first bearing housing,
a first compressor housing; and
having a low-pressure turbocharger which has
a second turbine housing,
a second bearing housing,
a second compressor housing; wherein the first and second turbine housings are combined to form one turbine housing unit, and further comprising an inner shell inserted completely within the one turbine housing unit and through which gas flows, the inner shell extending throughout the first and second turbine housings of the one turbine housing unit, and an air gap surrounding the inner shell and positioned between the inner shell and the one turbine housing unit.

2. A product as set forth in claim 1, wherein the first and second compressor housings are combined to form one compressor housing unit and the first and second bearing housings are combined to form one bearing housing unit, and wherein the turbine housing unit, the bearing housing unit and the compressor housing unit are connected to one another by means of a screw connection, welded connection, adhesive connection or clamping connection.

3. A product as set forth in claim 1, wherein a high-pressure turbine of the high-pressure turbocharger has an integrated bypass with a bypass valve.

4. A product as set forth in claim 1, wherein a low-pressure turbine of the low-pressure turbocharger has an integrated wastegate arrangement.

5. A product as set forth in claim 1, wherein the first and second bearing housings are combined to form one bearing housing unit, the one bearing housing unit being provided with a single cooling duct cooling the first bearing housing and second bearing housing.

6. A product as set forth in claim 1, wherein the turbine housing unit is provided with at least one cooling duct.

* * * * *